Patented Jan. 21, 1936

2,028,469

UNITED STATES PATENT OFFICE 2,028,469

WATERINSOLUBLE AZODYESTUFFS DERIVED FROM BENZOCARBAZOLES

Wilhelm Neelmeier, Leverkusen-Weisdorf, and Heinrich Morschel, Cologne-Deutz, Germany, assignors to General Aniline Works, Inc., New York, N. Y., a corporation of Delaware No Drawing. Application February 13, 1933, Serial No. 656,624. In Germany February 18, 1932

10 Claims. (Cl. 260—46.1)

The present invention relates to new waterinsoluble azodyestuffs, more particularly it relates to dyestuffs which may be represented by the probable general formula:

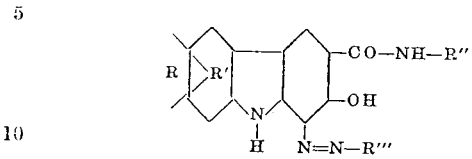

wherein R stands for a tetramethine chain linked to two vicinal carbon atoms of the benzene nucleus R', R'' stands for a non-sulfonated and non-carboxylated aromatic radical, such as a radical of the benzene, naphthalene and carbazole series, and R''' stands for the radical of a non-sulfonated and non-carboxylated diazotized component suitable for producing azodyestuffs; as substituents which may occur in the nuclei R'' and R''' there may be mentioned by way of example, alkyl, alkoxy, halogen and the nitro group.

Our new waterinsoluble dyestuffs are obtainable by coupling in substance or on a substratum a diazotized non-sulfonated and non-carboxylated amine suitable for producing azodyestuffs with a 5, 6-, 6, 7-, or 7, 8- benzo-2-hydroxycarbazole-3-carboxylic acid arylamide. The shades when produced on the fibre, according to the usual method of producing ice colors, are distinguished by good fastness properties.

The coupling components used in our invention have been described and claimed in the application for Letters Patent Serial No. 656,622, filed February 13, 1933 and entitled "New hydroxybenzocarbazole compounds", one of us being a co-inventor in said application. They are obtainable by carbonating 2-hydroxybenzocarbazole and condensing the 2-hydroxybenzocarbazole-3-carboxylic acid with non-sulfonated and non-carboxylated aromatic amines to the corresponding arylamides.

The invention is illustrated by the following examples, without being limited thereto:

Example 1.—20 grams of well boiled and dried cotton yarn are impregnated for half an hour in one liter of an aqueous solution containing 3 grams of 2-hydroxy-5,6-benzocarbazole-3-carboxylic acid-p-chloroanilide, 10 ccs. of aqueous caustic soda of 34° Bé. strength and 10 ccs. of Turkey red oil of 50% strength, well squeezed and, without drying, introduced for about half an hour into a diazo solution of one liter, prepared in the usual manner by diazotizing 2 grams of 4-chloro-2-toluidine and neutralizing the mineral acid by the addition of sodium acetate. The cotton is rinsed, soaped in a boiling bath and dried. A yellowish-brown of good fastness properties is thus obtained. The dyestuff probably has the following formula:

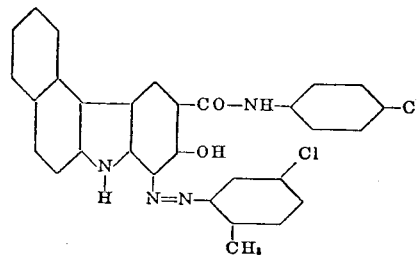

Example 2.—20 grams of well boiled and dried cotton yarn are impregnated for half an hour in one liter of an aqueous solution containing 1.2 grams of 2-hydroxy-7,8-benzocarbazole-3-carboxylic acid-p-anisidide, 10 ccs of aqueous caustic soda of 34° Bé., and 10 ccs of Turkey red oil of 50% strength, well squeezed and, without drying, introduced for about half an hour into a diazo solution of one liter, prepared in the usual manner by diazotizing 2 grams of 2-chloroaniline and neutralizing the mineral acid by the addition of sodium acetate. The cotton is rinsed, soaped in a boiling bath and dried. A yellowish-brown of excellent fastness properties is thus obtained.

The dyestuff corresponds to the probable formula:

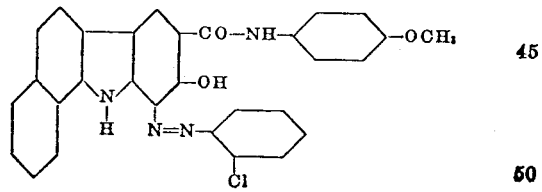

In the following table there are given some further combinations and their shades, obtainable in an analogous manner:

| Coupling component | Diazotization component | Shade |
|---|---|---|
| 2-hydroxy-5,5-benzocarbazole-3-carboxylic acid-p-chloroanilide. | 3-chloroaniline | Khakibrown. |
| Do | 2-chloroaniline | Yellowish-brown. |
| Do | 4-nitro-2-anisidine | Brown. |
| Do | 2-aminonaphthalene. | Do. |
| 2-hydroxy-5,6-benzocarbazole-3-carboxylic acid-m-chloroanilide. | 4-chloro-2-toluidine | Yellowish-brown. |
| Do | 2-chloroaniline | Do. |
| Do | 5-chloro-2-toluidine. | Brown. |
| Do | 4-nitro-2-anisidine. | Reddish-brown. |
| 2-hydroxy-5,6-benzocarbazole-3-carboxylic acid-o-toluidide. | 3-chloroaniline | Khakibrown. |
| Do | 2-chloroaniline | Brown. |
| Do | 4-chloro-2-toluidine. | Yellowish-brown. |
| Do | 5-nitro-2-anisidine. | Reddish-brown. |
| 2-hydroxy-5,6-benzocarbazole-3-carboxylic acid-α-naphthylamide. | 2-chloroaniline | Brown. |
| 2-hydroxy-7,8-benzocarbazole-3-carboxylic acid-p-anisidide. | 4-chloro-2-toluidine | Yellowish-brown. |
| 2-hydroxy-7,8-benzocarbazole-3-carboxylic acid-o-methyl-p-anisidide. | 2,5-dichloroaniline. | Orange brown. |
| Do | m-amido-azo-toluene. | Reddish dark brown. |
| Do | 2-chloro-4-benzoylamino-5-methoxyaniline. | Reddish brown. |
| 2-hydroxy-7,8-benzocarbazole-3-carboxylic acid-2-carbazoleamide. | 4-nitro-2-anisidine. | Brown. |
| 2-hydroxy-7,8-benzocarbazole-3-carboxylic acid-β-naphthylamide. | 2-chloroaniline | Yellowish brown. |
| 2-hydroxy-7,8-benzocarbazole-3-carboxylic acid-4'-chloro-2'-methyl-1'-phenylamide. | 2,5-dichloroaniline. | Orange brown. |
| Do | 4-nitro-2-anisidine. | Reddish brown. |
| 2-hydroxy-7,8-benzocarbazole-3-carboxylic acid-5'-chloro-2'-methyl-1'-phenylamide. | 4-chloro-2-anisidine. | Do. |
| Do | 4-nitro-2-toluidine. | Orange brown. |
| Do | 2-aminonaphthalene. | Brown. |

We claim:

1. Dyestuffs of the formula:

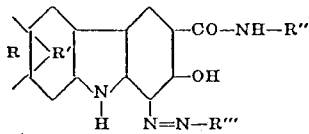

wherein R stands for a tetramethine chain linked to two vicinal carbon atoms of the benzene nucleus R', R" stands for a non-sulfonated and non-carboxylated radical of the aromatic series, and R''' stands for the radical of a non-sulfonated and non-carboxylated diazotized component suitable for producing azodyestuffs, yielding, when produced on the fibre, various shades of good fastness properties.

2. Dyestuffs of the formula:

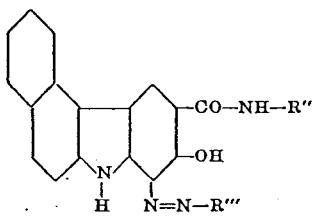

wherein R" stands for a non-sulfonated and non-carboxylated radical of the benzene or naphthalene series, and R''' stands for the radical of a non-sulfonated and non-carboxylated diazotized component suitable for producing azodyestuffs, yielding, when produced on the fibre, various shades of good fastness properties.

3. Dyestuffs of the formula:

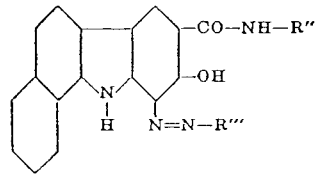

wherein R" stands for a non-sulfonated and non-carboxylated radical of the benzene or naphthalene series, and R''' stands for the radical of a non-sulfonated and non-carboxylated diazotized component suitable for producing azodyestuffs, yielding, when produced on the fibre, various shades of good fastness properties.

4. The dyestuff of the formula:

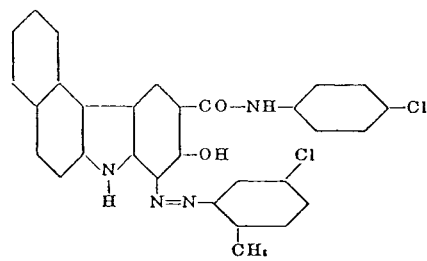

yielding, when produced on the fibre, yellowish-brown shades of good fastness properties.

5. The dyestuff of the formula:

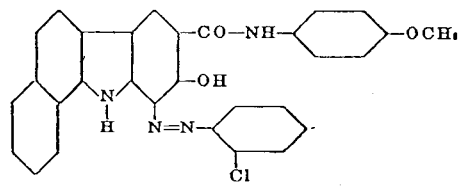

yielding, when produced on the fibre, yellowish-brown shades of good fastness properties.

6. Fibre dyed with a dyestuff as claimed in claim 1.

7. Fibre dyed with a dyestuff as claimed in claim 2.

8. Fibre dyed with a dyestuff as claimed in claim 3.

9. Fibre dyed with the dyestuff as claimed in claim 4.

10. Fibre dyed with the dyestuff as claimed in claim 5.

WILHELM NEELMEIER.
HEINRICH MORSCHEL.